United States Patent
Panfil et al.

(10) Patent No.: US 12,166,376 B2
(45) Date of Patent: Dec. 10, 2024

(54) POWER SUPPLY MANAGEMENT SYSTEM AND METHOD FOR USE WITH ONE OR MULTIPLE DIFFERENT UTILITY PROXIES

(71) Applicant: Vertiv Corporation, Westerville, OH (US)

(72) Inventors: Peter A. Panfil, Columbus, OH (US); Arturo Di Filippi, Bologna (IT); Giovanni Zanei, Faenza (IT); Graziano Galuppi, Imola (IT); David Sonner, Galena, OH (US)

(73) Assignee: Vertiv Corporation, Westerville, OH (US)

( * ) Notice: Subject to any disclaimer, the term of this patent is extended or adjusted under 35 U.S.C. 154(b) by 0 days.

(21) Appl. No.: 17/236,462

(22) Filed: Apr. 21, 2021

(65) Prior Publication Data

US 2021/0249896 A1     Aug. 12, 2021

Related U.S. Application Data

(63) Continuation-in-part of application No. 17/171,555, filed on Feb. 9, 2021.

(Continued)

(51) Int. Cl.
    *H02J 9/06*        (2006.01)
    *H02J 3/46*        (2006.01)

(52) U.S. Cl.
    CPC .............. *H02J 9/061* (2013.01); *H02J 3/46* (2013.01); *H02J 9/062* (2013.01)

(58) Field of Classification Search
    CPC .............. H02J 9/061; H02J 3/46; H02J 9/062

(Continued)

(56) References Cited

U.S. PATENT DOCUMENTS 9,300,171 B2    3/2016   Moth
10,432,017 B1 *   10/2019   Morales .............. H02J 7/00712

(Continued)

FOREIGN PATENT DOCUMENTS

CN     102210081 A    10/2011
CN     106208367 A    12/2016

(Continued)

OTHER PUBLICATIONS

International Search Report and Written Opinion regarding International Application No. PCT/US2021/017376, dated Apr. 23, 2021.

(Continued)

*Primary Examiner* — Michael R. Fin
(74) *Attorney, Agent, or Firm* — HARNESS, DICKEY & PIERCE, P.L.C.

(57) ABSTRACT

The present disclosure relates to a power supply management system adapted for use with at least one utility proxy power source, to control powering first and second loads when an AC mains power source is not available to provide power to the loads. The system uses an internal DC bus of a power converter to receive power from a utility proxy, and a DC/DC converter/charger of the power converter to receive power from a short term supplemental battery subsystem. The DC/DC converter/charger is used to supply a first AC output signal to power the first load. An AC/DC rectifier of the power converter uses the DC power from the utility proxy, supplied onto the internal bus, to generate a second AC output signal which is applied independently to the second load to power the second load fully independently of the first load.

16 Claims, 10 Drawing Sheets

Related U.S. Application Data

(60) Provisional application No. 63/009,096, filed on Apr. 13, 2020, provisional application No. 62/972,521, filed on Feb. 10, 2020.

(58) Field of Classification Search
USPC .............................................. 307/66, 64, 65
See application file for complete search history.

(56) References Cited

U.S. PATENT DOCUMENTS

| | | | | |
|---|---|---|---|---|
| 10,432,082 | B1* | 10/2019 | Sharifipour | H02M 3/10 |
| 2005/0143846 | A1* | 6/2005 | Kocher | G05B 11/32 |
| | | | | 700/74 |
| 2006/0022524 | A1* | 2/2006 | Bryde | H02J 9/061 |
| | | | | 307/64 |
| 2006/0192435 | A1* | 8/2006 | Parmley | H02J 1/10 |
| | | | | 700/286 |
| 2006/0226706 | A1* | 10/2006 | Edelen | H02J 9/062 |
| | | | | 307/64 |
| 2007/0210652 | A1* | 9/2007 | Tracy | H02J 9/062 |
| | | | | 307/66 |
| 2008/0067872 | A1* | 3/2008 | Moth | H02J 9/062 |
| | | | | 307/23 |
| 2010/0194341 | A1 | 8/2010 | Anupindi et al. | |
| 2011/0187197 | A1 | 8/2011 | Moth | |
| 2011/0283119 | A1* | 11/2011 | Szu | H04L 12/10 |
| | | | | 713/300 |
| 2012/0025615 | A1* | 2/2012 | Kim | H02J 9/062 |
| | | | | 307/66 |
| 2012/0068541 | A1 | 3/2012 | Anderson | |
| 2014/0379160 | A1* | 12/2014 | Fallon | G06Q 50/06 |
| | | | | 700/297 |
| 2016/0036070 | A1 | 2/2016 | Peterson et al. | |
| 2016/0197517 | A1 | 7/2016 | Bundschuh et al. | |
| 2016/0329713 | A1 | 11/2016 | Berard | |
| 2017/0012429 | A1 | 1/2017 | Nanda | |
| 2019/0067989 | A1* | 2/2019 | Beg | H02J 3/388 |
| 2021/0363651 | A1* | 11/2021 | Seymour | H02J 3/1892 |

FOREIGN PATENT DOCUMENTS

| | | |
|---|---|---|
| CN | 109240223 A | 1/2019 |
| CN | 109428393 A | 3/2019 |
| CN | 110710083 A | 1/2020 |
| EP | 2793345 A1 | 10/2014 |
| WO | WO-2013088798 A1 | 6/2013 |

OTHER PUBLICATIONS

Chinese Office Action issued in corresponding Chinese Patent Application for Invention No. 202180013338.9 Including Supplemental Search Report dated Aug. 19, 2023.

Chinese Office Action and Search Report, corresponding Chinese Patent Application No. 202180013338.9 dated Feb. 3, 2023, 10 pages.

* cited by examiner

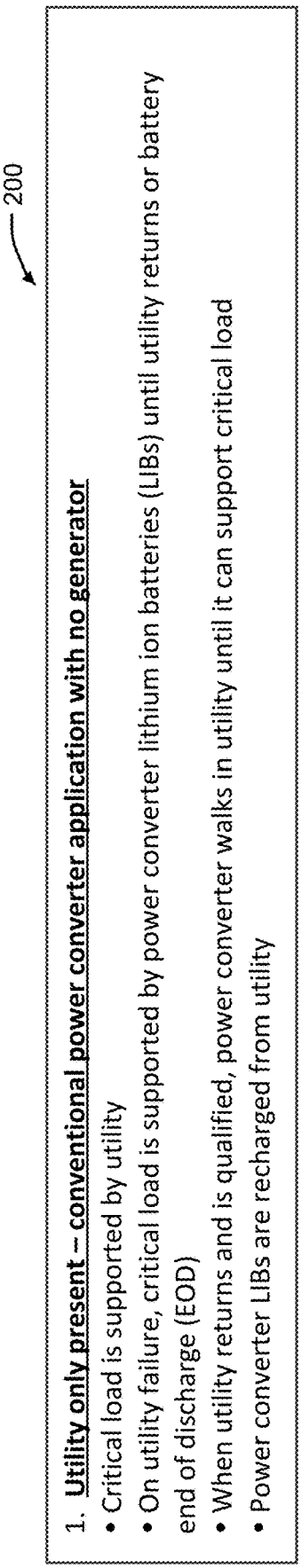

1. Utility only present – conventional power converter application with no generator

- Critical load is supported by utility
- On utility failure, critical load is supported by power converter lithium ion batteries (LIBs) until utility returns or battery end of discharge (EOD)
- When utility returns and is qualified, power converter walks in utility until it can support critical load
- Power converter LIBs are recharged from utility

FIG. 3

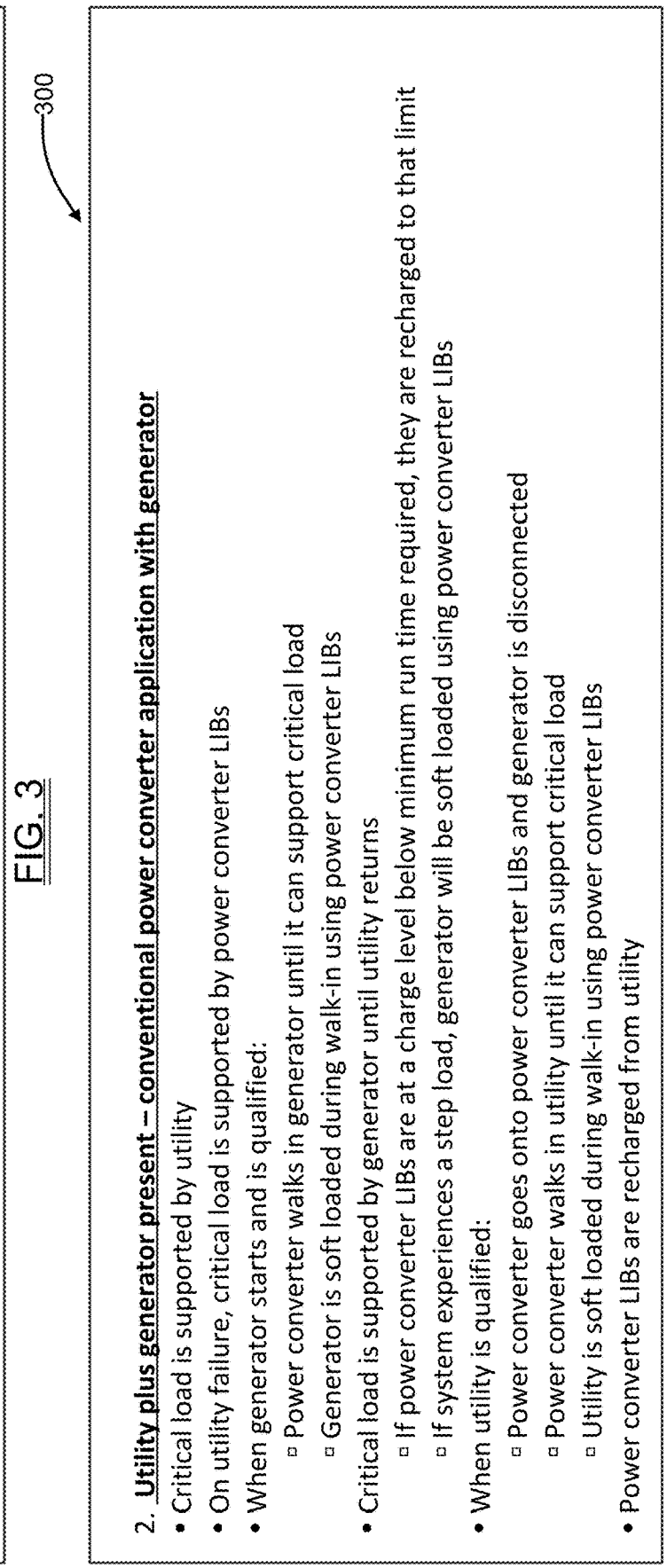

2. Utility plus generator present – conventional power converter application with generator

- Critical load is supported by utility
- On utility failure, critical load is supported by power converter LIBs
- When generator starts and is qualified:
  - Power converter walks in generator until it can support critical load
  - Generator is soft loaded during walk-in using power converter LIBs
- Critical load is supported by generator until utility returns
  - If power converter LIBs are at a charge level below minimum run time required, they are recharged to that limit
  - If system experiences a step load, generator will be soft loaded using power converter LIBs
- When utility is qualified:
  - Power converter goes onto power converter LIBs and generator is disconnected
  - Power converter walks in utility until it can support critical load
  - Utility is soft loaded during walk-in using power converter LIBs
- Power converter LIBs are recharged from utility

FIG. 4

3. Utility plus extended run LIB, no generator
- Critical load is supported by utility
- On utility failure, critical load is supported by power converter LIBs
- Islanding logic isolates utility
- Power converter draws energy from power converter LIBs in source-share mode to until extended run LIB comes up to capacity
    - ▫ Extended run LIB is soft loaded during walk-in using power converter LIBs
- Critical load is supported by extended run LIB until utility returns
    - ▫ If power converter LIBs are at charge level below minimum run time required, they are recharged to that limit
    - ▫ If system experiences step load, extended run LIB will be soft loaded using power converter LIBs
- When utility is qualified:
    - ▫ Power converter goes onto power converter LIBs and extended run LIB changes from source to recharge mode
    - ▫ Power converter walks in utility until it can support critical load
- Power converter LIBs and extended run LIB are recharged from utility
    - ▫ If fuel cell is present, extended run LIB may be held in partial recharge state so they can be used to absorb any additional power generated by fuel cell that is not required by critical load

FIG. 5

POWER SUPPLY MANAGEMENT SYSTEM AND METHOD FOR USE WITH ONE OR MULTIPLE DIFFERENT UTILITY PROXIES

CROSS-REFERENCE TO RELATED APPLICATIONS

This application claims the benefit of U.S. non-provisional application Ser. No. 17/171,555, filed on Feb. 9, 2021, which in turn claims the benefit of U.S. Provisional Application No. 63/009,096, filed Apr. 13, 2020, and U.S. Provisional Application No. 62/972,521, filed Feb. 10, 2020. The entire disclosure of each of the above applications is incorporated herein by reference.

FIELD

The present disclosure relates to power supply management systems and methods, and more particularly to a power supply management system and method which makes use of both a utility proxy and supplemental DC power sources to provide independent AC outputs to separately power both IT loads and mechanical loads in an efficient manner, when power from a utility becomes unavailable.

BACKGROUND

The statements in this section merely provide background information related to the present disclosure and may not constitute prior art.

In many applications, particularly such as data centers, hospitals, financial institutions, etc., there is a need for reliable electrical power to power various computer related equipment and other types of electronic equipment. To this end, such environments often may implement two or more sources of backup power in the event AC mains power is lost.

Interest in the use of both fuel cells and integrated battery power subsystems are gaining in popularity as utility proxies in critical applications. However, fuel cells in particular have traditionally suffered from significant limitations that have limited their applicability as a utility proxy. One particularly significant limitation is the inability of a traditional fuel cell, such as a solid oxide fuel cell, to respond sufficiently fast in real time to meet the needs of a load when called on to do so. Fuel cells are known to have a general "spongy" response when loaded, meaning that they are generally not able to respond virtually instantaneously to increases or decreases in the load. To a lesser extent, this limitation may also be experienced when using an integrated battery power subsystem (which provides an AC output) as a utility proxy. Still further, this "sponginess" in response is also typically present with both diesel and natural gas powered generators, but to a lesser extent than with fuel cells.

Another drawback with fuel cells is that their power output is more difficult to closely regulate, which can result in time periods where the fuel cell is producing more power than is needed by the critical load. In that instance the excess power must be channeled to a supplemental load, which amounts to wasted energy.

Still another limitation is when IT (Information Technology) loads made up of IT equipment (e.g., servers, network switches, PDUs, etc.) and mechanical loads (e.g., motor driven devices, valves, fans, etc.) need to be powered simultaneously during a power outage affecting the utility. In such instances, it is highly desirable to be able to provide separate AC outputs to the IT and mechanical loads, for example to ensure that the IT load(s) is/are receiving highly conditioned AC power. However, with present day backup power systems this can be challenging, especially if only a single power converter is available. Often backup power may be available from more than one external utility proxy power source, but using power from the multiple available backup power sources in an efficient manner to independently power both the IT loads and the mechanical loads remains a challenge.

Accordingly, there is a need for systems and methods that make better and more efficient use of both fuel cells and integrated battery power subsystems as utility proxies for powering critical loads, and which overcome the above-described, well-known drawbacks associated with these types of utility proxies.

SUMMARY

This section provides a general summary of the disclosure, and is not a comprehensive disclosure of its full scope or all of its features.

In one aspect the present disclosure relates to a power supply management system adapted for use with at least one utility proxy power source, to help control powering first and second independent loads when an AC mains power source is not available to provide power to the load. The system may comprise a power converter forming an uninterruptible power supply, the power converter including an internal DC bus, an AC/DC rectifier, a DC/DC converter/charger, and a DC/AC inverter. The system may further comprise a short term supplemental battery subsystem in communication with the power converter and a utility proxy. The power converter is configured such that the DC/AC inverter receives DC current flowing on the internal DC bus from the short term supplemental battery subsystem, and generates a first AC power signal which is transmitted to the first load to power the first load. The AC/DC rectifier receives a DC current from the utility proxy and generates a second AC power signal therefrom which is transmitted to the second load to independently power the second load.

In another aspect the present disclosure relates to a power supply management system adapted for use with at least one utility proxy power source, to help control powering first and second independent loads when an AC mains power source is not available to provide power to the load. The system may comprise a power converter forming an uninterruptible power supply. The power converter may include a first DC bus forming an internal DC bus, an AC/DC rectifier, a DC/DC converter/charger and a DC/AC inverter. The system may further include a second DC bus and a short term supplemental battery subsystem in communication with the second DC bus at a first point thereof. The second DC bus is coupled at a second point thereof to the DC/DC converter/charger of the power converter to enable DC power from the short term supplemental battery subsystem to be supplied to the DC/DC converter/charger. The system may further include a third DC bus configured to be coupled at a first point thereof to a utility proxy, and at a second point to the internal bus of the power converter. The power converter is configured such that the DC/AC inverter receives DC current flowing on the internal DC bus, which is supplied from the short term supplementary battery subsystem, through the DC/DC converter/charger, and generates a first AC power signal which is transmitted to the first load to power the first load. The AC/DC rectifier simultaneously receives DC current from the utility proxy on the internal bus, and generates a second AC power signal therefrom which is transmitted to the second load to independently power the second load.

In still another aspect the present disclosure relates to a method for supplying AC power independently to first and second loads when a utility powering the first and second loads becomes unavailable. The method may comprise supplying power via a first external bus from a remote short term supplemental battery subsystem to a DC/DC converter/charger of a power converter, with the DC/DC converter/charger being in communication with an internal DC bus of the power converter. The method may further include supplying DC current via a second external bus from a utility proxy to the internal bus of the power converter. The method may further include using the DC/DC converter/charger to generate a first AC power signal which is applied to a first load to power the first load, and feeding DC current supplied onto the internal bus by the utility proxy in a reverse direction into the AC/DC rectifier using the internal bus, and using the AC/DC rectifier to generate a second AC power signal. The method may further include feeding the second AC power signal out from the power converter to a second load to power the second load independently of the first load.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a table listing operations for a power converter operating in a conventional uninterruptible power supply (UPS) application with no generator available, when power from a utility is lost;

FIG. 4 is a table listing operations for a power converter that has an available generator;

FIG. 5 is a table listing operations for a power converter that has available an integrated battery storage subsystem employing an extended run lithium ion battery pack ("extended run LIB"), but no generator, for assisting with conditions where power from a utility is lost;

DETAILED DESCRIPTION

Example embodiments will now be described more fully with reference to the accompanying drawings.

Figure 1:
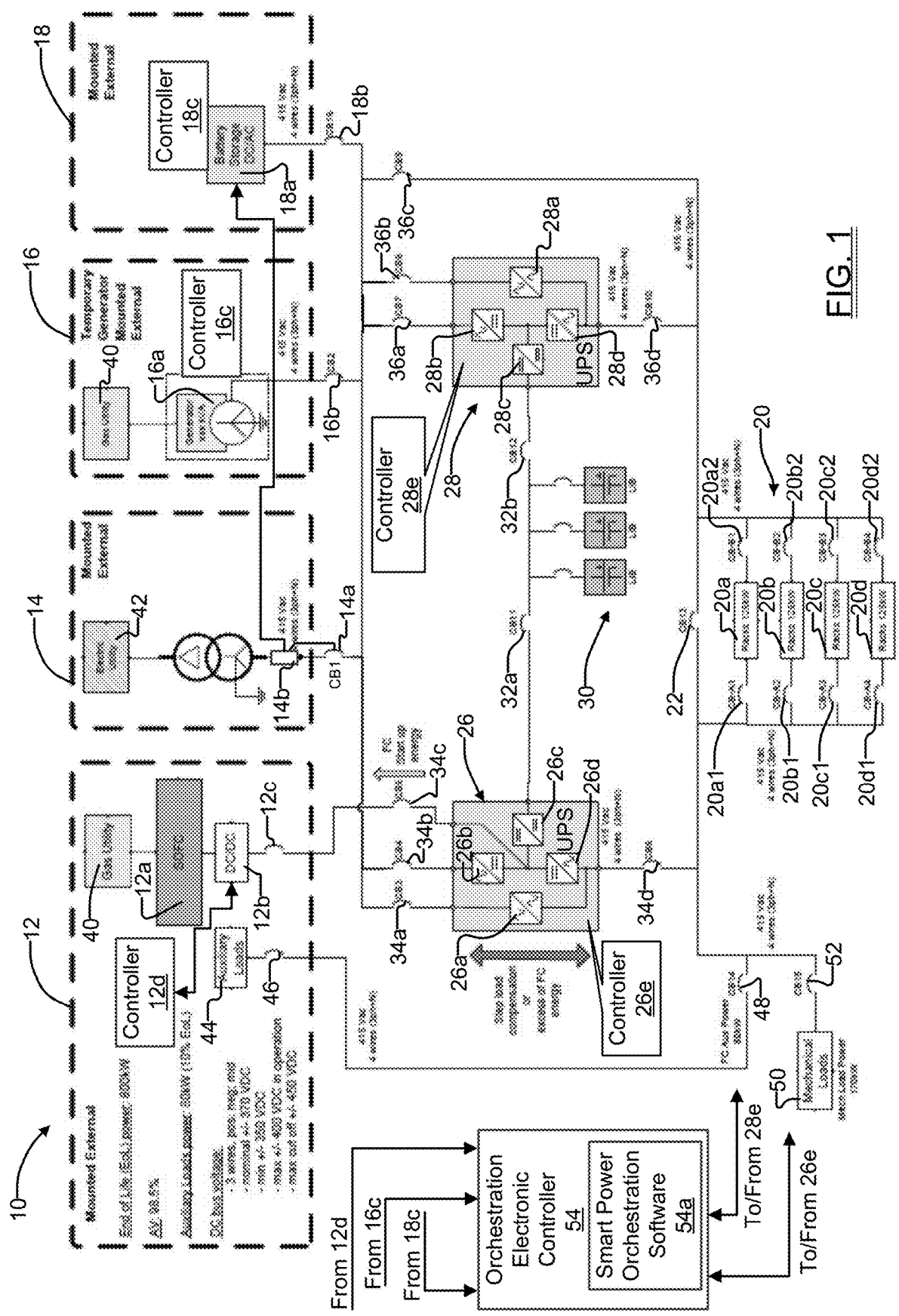
FIG. 1 is a high level schematic diagram of one embodiment of a system in accordance with the present disclosure.

Referring to FIG. 1, one embodiment of a power supply/management system 10 is shown in accordance with the present disclosure. The system 10 in this example makes use of four distinct power supply sources: a fuel cell subsystem 12, an electric utility power source 14 (i.e., AC mains power source), an external generator subsystem 16 (either diesel powered or natural gas powered), and an integrated battery power subsystem 18. The power supply sources 12, 14, 16 or 18 may be used, in any hierarchical order, to power a load 20. The power supply sources 12, 16 and 18 in this example form utility "proxies", meaning they act as a substitute for the electric utility power source 14 when the utility power source 14 is not available. It will be appreciated that other utility proxies, for example, back-up systems to the power supply sources 12, 16 or 18, may be incorporated into the system 10. And while a fuel cell subsystem, an external generator subsystem and an integrated battery power subsystem have been illustrated as substitute power sources, it will be appreciated that the system 10 is not limited to use with only these types of alternative power sources. Virtually any other form of alternative power source may be incorporated into the system 10 with little or no modification to the system.

The load 20 in this example is shown as four rows of equipment racks 20a-20d each receiving 125 KW of electrical power. Of course, other types of loads may be powered by the system 10, as will be discussed further in the following paragraphs. Accordingly, the system 10 is not limited to use with only equipment rack mounted electrical computing components. The supply of power to the loads 20a-20d may be controlled through a plurality of circuit breakers 22 and 20a1/20a2, 20b1/20b2, 20c1/20c2, 20d1/20d2, the operation of which will be explained more fully in the following paragraphs.

The system 10 in this example also makes use of two power converters 26 and 28 which are coupled to each of the power supply sources 12-18, as well to the loads 20a-20d. By "power converter" it is meant a device that can function in the manner of a conventional uninterruptible power supply (UPS) that supports a load by drawing power from a battery or battery bank when utility power fails, but that has the additional capability of directing power from any power source to any load or to another power source to which it is connected. In this example the power converters 26 and 28 are configured in the well-known "redundant 1+1" configuration for even further improved reliability. A supplemental battery subsystem 30, in this example a bank of lithium ion batteries (hereinafter "power converter LIBs" 30) located remote from the power converters 26 and 28, is provided which may be coupled to either, or both, of the power converters 26 and 28 via selective closing of circuit breakers 32a and 32b located on a dedicated power bus 32c. The function of the power converter LIBs 30 is an important feature of the system 10 and will be explained in greater detail in the following paragraphs.

Coupling of the power converter 26 to the power sources 12-18 may be controlled by selective closing of circuit breakers 34a, 34b, and 34c, and to the load 20 via a circuit breaker 34d. Coupling of the power converter 28 to the power supply sources 12-18 is controlled by selective closing of the circuit breakers 36a and 36b, and to the load 20 by circuit breaker 36d. Power converter 26 includes a bypass circuit 26a, a rectifier subsystem 26b, a DC/DC converter 26c, a DC/AC inverter 26d and an electronic controller 26e. Power converter 28 likewise includes the same subsystems 28a-28e. The fuel cell subsystem 12 may include a fuel cell 12a, in this example a solid oxide fuel cell ("SOFC"), which receives natural gas from a gas utility 40. A DC/DC converter 12b converts the DC output from the fuel cell 12a to a DC output of different magnitude, which may then be fed by closing circuit breaker 12c and circuit breaker 34c to the power converter 26. The power converter 26 receives the DC power supplied from the fuel cell subsystem 12 at its inverter 26d and converts the DC power to AC power, which is then supplied to the load 20. The AC power may also be used by the DC/DC converter 26c of the power converter 26 to help recharge the power converter LIB 30. These operations are controlled by the electronic controller 26e. Advantageously, if the fuel cell subsystem 12 is producing more power than is required by the load 20, the excess power can be used to charge the power converter LIBs 30 and/or the extended run LIB 18a of the integrated battery power subsystem 18 (explained in greater detail in the following paragraphs), and if the power converter LIBs 30 and/or the extended run LIB 18a are adequately charged, the excess power can be delivered to the utility 14 or to an external generator port (not shown) of the electric generator 16a to help power other loads at the site. As a last resort when the fuel cell system 12 is producing excess power, a supplemental load (not shown) may be added to absorb excess power, or the fuel cell subsystem 12 output may be throttled back.

The utility power source 14 includes an electric utility 42 which can be used to supply AC power, in this example 415 Vac, to circuit breaker 14a and under voltage relay 14b, and to the bypass circuit 26a or 28a of either (or both) of the power converters 26 or 28, or alternatively to the rectifiers 26b or 28b (or both), depending on which of the circuit breakers 34a, 34b, 36a or 36b are selectively closed. While the under voltage relay 14b may not be needed in all applications, it is nevertheless helpful in sensing an under voltage (i.e., low voltage) condition existing at the output of the utility power source 14 and immediately opening the circuit breaker 14a and signaling the system 10 to switch to power from an alternate power source. In the example shown in the system 10, the alternate power source is the integrated battery power subsystem 18.

The generator subsystem 16 may receive natural gas from the gas utility 40 or it may use diesel fuel as its fuel source. For convenience, the following discussion will reference natural gas being used to power the generator subsystem 16. The generator subsystem 16 includes an electrical generator 16a which produces an AC output. The AC output in this example is 415 Vac, which may be supplied to the rectifiers 26b or 28b, or to the bypasses 26a or 28a, of the power converters 26 and 28 through circuit breaker 16b, or even to the load 20 via circuit breaker 16b and circuit breakers 36c and 22 and one or more of the circuit breakers 20a1/20a2, 20b1/20b2, 20c1/20c2 and 20d1/20d2.

The integrated battery power subsystem 18 may include a battery bank with an extended run LIB 18a having an associated inverter that converts the DC output of the extended run LIB 18a to an AC output, in this example a 415 Vac output. The AC output from the integrated battery power subsystem 18 may be applied through circuit breaker 18b to the rectifier 26b of the power converter 26, and/or to the rectifier 28b of power converter 28, or even directly to the load 20 via selective closing of the circuit breakers 36c and 22 and one or more of the circuit breakers 20a1/20a2, 20b1/20b2, 20c1/20c2 and 20d1/20d2.

Optionally, the output of the fuel cell subsystem 12 or the output of the integrated battery power subsystem 18 may be used to supply power to one or more auxiliary loads 44. This will involve, for example when using the fuel cell subsystem 12, selective closing of circuit breakers 12c, 34c, 34d, 46 and 48. For the case of the integrated battery power subsystem 18 this would involve selective closing of circuit breakers 18b, 36c, 48 and 46. Optionally, the fuel cell subsystem 12 or the integrated battery power subsystem 18 may also be used to supply AC power to one or more mechanical loads 50 through selective closing of circuit breaker 52. And of course, either one, or both, of the power converters 26 and 28 may drive the loads 44 and 50 as well, regardless of the power source that either one, or both, of the power converters 26 and 28 is/are being powered from.

As is understood in the industry, the utility breakers 12c, 14a, 16b and 18b are operated in a "break before make" fashion when switching between different power supply sources 12, 14, 16 and 18. A particular advantage of the system 10 is that the power converter LIB 30 can be used as a "bridge" to provide power to the power converter 26 or 28 while switching from one power source to another.

To coordinate overall operation and monitoring of the system 10, an orchestration electronic controller 54 having a smart power orchestration software module 54a (hereinafter simply "software module" 54a) may be included. The orchestration electronic controller 54 (hereinafter simply "controller" 54) receives inputs from an electronic controller 12d associated with the fuel cell subsystem 12, from an electronic controller 16c associated with the natural gas powered generator subsystem 16, and from an electronic controller 18c associated with the integrated battery power subsystem 18. The controller 54 is also in bi-directional communication with the electronic controller 26e of the power converter 26 and the electronic controller 28e of the power converter 28. The controller 54 and its software module 54a monitor overall operation of the power converters 26 and 28 using information received from the electronic controllers 26e and 28e. The controller 54 also uses information received from the electronic controllers 12d, 16c and 18c, in real time, to monitor which power supply source 12-18 is presently being used at any given time. Optionally, the controller 54 may also be in communication with a separate, remote controller (not shown) either through a wired or wireless connection to receive additional information or commands to help operate system 10.

The software module 54a may be constructed to help the system 10 carry out any desired hierarchical power source usage scheme. For example, the software module 54a may include one or more programs or submodules that control the system 10 to use power from the electric utility power supply source 14 if available, but if not, then the integrated battery power subsystem 18 if available, and if not, then the fuel cell subsystem 12 if available, and if not, then the natural gas generator subsystem 16. Virtually any hierarchical power use scheme may be employed, and the software module 54a can be readily modified or updated to accommodate other new power sources which are added at a later date. The software module 54a can also be updated to incorporate a modification to an existing hierarchical power usage scheme, should any one of the utility proxies be removed from the system 10. As described in the following paragraphs, the software module 54a may further be constructed to include programs or submodules that may perform functions such as demand management, energy cost optimization, and grid stabilization.

The power converter controllers 26e and 28e may also perform the functions of "qualifying" the power being received via any of the power supply sources 12-18, which involves monitoring frequency, voltage and/or current of the signal being received, and taking action to inform the controller 54 if power being received from the currently selected power source varies unacceptably in any way (e.g., unacceptable frequency variation, above a set upper voltage threshold, below a set lower voltage threshold, etc.). The controller 54 may use this information to command switching over, in real time, to a different power source, by selective closing and opening of the various circuit breakers used in the system 10.

An especially important advantage of the system 10 is the use of the power converter LIBs 30 to augment the AC power provided by any of the power supply sources 12, 14, 16 or 18. In particular, the use of the fuel cell subsystem 12, which has a "spongy" response to loads, meaning it cannot respond virtually instantaneously to the demands of the load, benefits significantly through the use of the power converter LIBs 30. The power converter LIB 30 can also be used to supply power from the power converter 26 through the breakers 32a, 34c and 12c to the DC/DC converter 12b of the fuel cell subsystem 12 to help "heat up" the fuel cell subsystem, during start-up of the fuel cell subsystem 12. The power converter LIBs 30 can be used to augment the output of the power converter 26 or 28, depending on which one of circuit breakers 32a or 32b is closed, when the power converter is receiving the output from the fuel cell subsystem 12, to better ensure a uniform output from the power converter(s) 26 and/or 28. Closing both circuit breakers 32a and 32b enables the power converter LIBs 30 to provide DC power to both power converters 26 and 28 simultaneously if both power converters are operating. Depending on the specific model/make of the integrated battery power subsystem 18 being used, this subsystem may also suffer from an unacceptably long response time and/or inability to rapidly respond to a demand from the load, and therefore also benefit from the use of the power converter LIBs 30.

Figure 2:
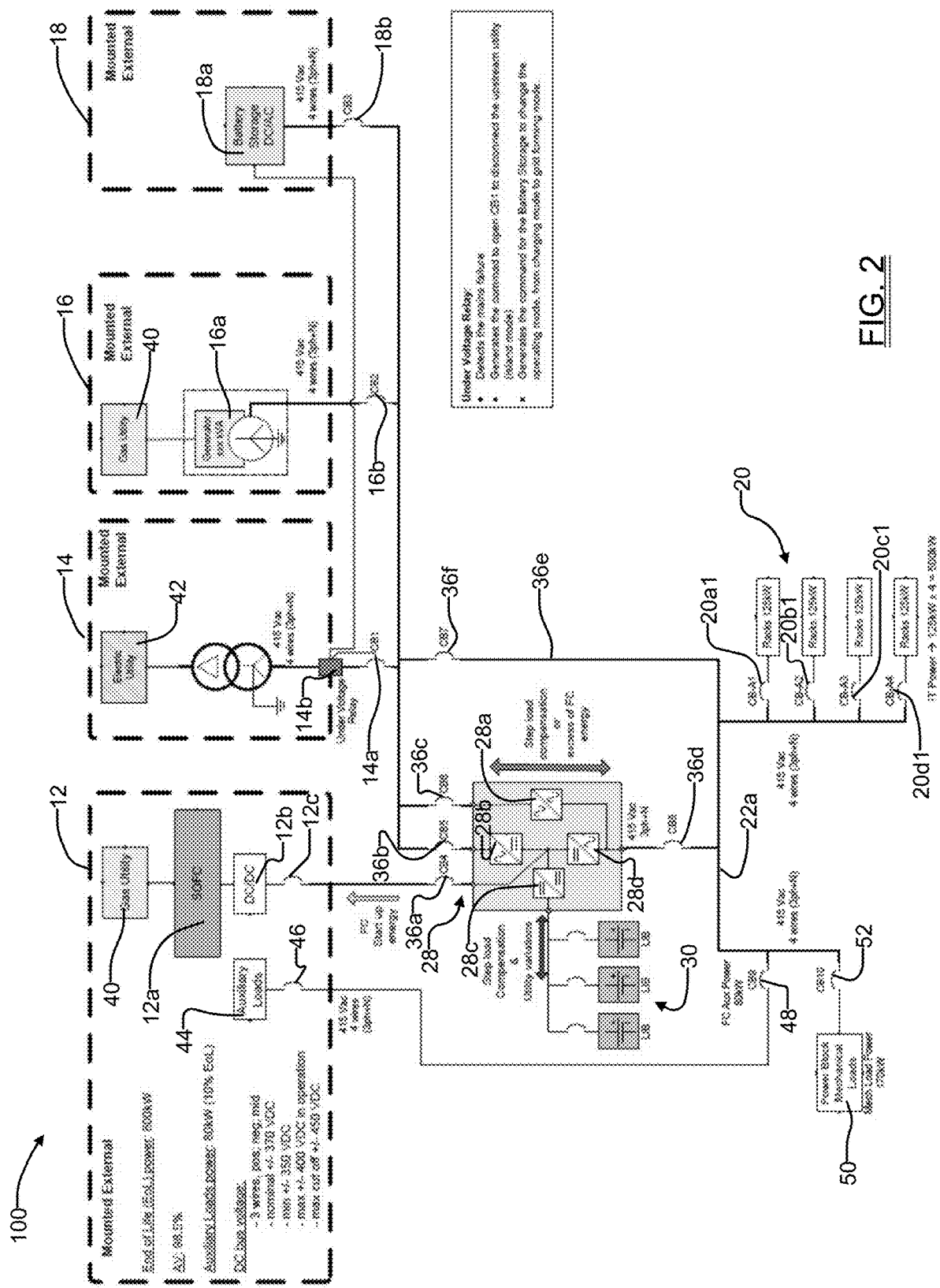
FIG. 2 is another embodiment of the present disclosure that illustrates "islanding" (i.e., isolating) of the integrated battery storage subsystem from the other power sources.

Referring to FIG. 2, a system 100 in accordance with another embodiment of the present disclosure is shown. Components in common with those of the system 10 are labelled with the same reference number of their corresponding component in system 10. To avoid cluttering the drawing the controllers 54, 26e, 28e, 12d, 16c and 18c have been omitted in FIG. 2, although it will be appreciated that these components may be present and perform the same operations as described for the system 10 of FIG. 1. To simplify the discussion of the system 100, only the power converter 28 is shown as part of the system, with it being understood that power converter 26 could easily be incorporated in the manner shown in FIG. 1.

The system 10 of FIG. 1 and the system 100 of FIG. 2 are each configured to "island" the integrated battery power subsystem 18. By "island" it is meant to isolate the integrated battery power subsystem 18 from the power supply sources 12-16. This eliminates any direct circuit path for the output from the integrated battery power subsystem 18 to flow directly into any of the power supply sources 12-16, while still providing a configuration that enables re-charging of the integrated battery power subsystem 18 when one of the other power supply sources 12, 14 or 16 becomes available for use. A configuration that "islands" the integrated battery power subsystem 18 may be recommended by the manufacturer of the subsystem. For example, certain integrated battery packs available from Tesla, Inc., which may be used with the systems 10 or 100 as the integrated battery power subsystem 18, are recommended to be islanded from all other available power sources.

The system 100 of FIG. 2 is less complex than system 10 of FIG. 1 and thus will be referred to throughout the following paragraph in order to provide a more convenient explanation of islanding. Islanding of the integrated battery power subsystem 18 (i.e., isolating from the electric utility power supply source 14 and the generator subsystem 16 via breakers 14a and 16b) still permits communication of an output side of the circuit breaker 18b directly with the load 20 and with the power converter 26. This is accomplished by tying the output side of the circuit breaker 18b to both a power bus portion 22a of the system through the circuit breaker 36f, and to the input sides of the bypass circuit 28a and the rectifier circuit 28b of the power converter 28 (through circuit breakers 36c and 36b, respectively).

In operation, when circuit breakers 18b and 36c are closed, and circuit breakers 14a, 16b, 36b and 36f are opened, the output of the integrated battery power subsystem 18 can be applied to the bypass circuit 28a of the power converter 28. When the circuit breakers 20a1/20b1/20c1/20d1 on the input side of the load 20 are closed, then AC power from the integrated battery power subsystem 18 will be directly applied to the power bus portion 22a and used to power the load 20. In this configuration there is no possibility of the integrated battery power subsystem 18 applying any portion of its output to any one of the power supply sources 12, 14 or 16. If needed to augment the output of the battery power subsystem 18, the power converter LIBs 30 can help by applying their output to the DC/DC converter 28c, which is converted to an AC output by the inverter 28d before being placed on the power bus portion 22a (through circuit breaker 36d).

In the event of a fault in the power converter 28, the integrated battery power subsystem 18 may still be used to directly power the load 20 by closing circuit breakers 18b and 36f, and opening circuit breakers 14a, 16b, 36b and 36c. In this configuration a maintenance line 36e is used to help create a direct path from the integrated battery power subsystem 18 to the power bus portion 22a, and thus to the load 20.

When recharging of the integrated battery power subsystem 18 is needed, circuit breaker 18b is closed, circuit breaker 36f is opened, and either one of circuit breakers 14a or 16b is closed. This enables power to be provided by either one of the power sources 14 or 16 to the battery integrated power subsystem 18 for re-charging, as well as simultaneously to either the rectifier circuit 28b or the bypass circuit 28a of the power converter 28, depending on which one of circuit breakers 36b and 36c is closed. Thus, re-charging can be accomplished simultaneously while the power source 14 or 16 is supplying power to the power converter 28.

FIGS. 3-5 provide examples of operations that may be performed by the system 10 when a power converter 26 or 28 is used with different power sources or combinations of power sources, i.e., utility power supply source 14 and/or utility proxy power supply sources 12, 16 and 18. FIG. 3 illustrates a table 200 showing various operations that may be performed by the system 10 when only power from the utility is present (i.e., power from utility power source 14) and at least one of the power converters 26 or 28 is present. In these operations, the power converter 26 or 28 functions as a conventional UPS when utility power is lost. FIG. 4 illustrates a table 300 showing operations that may be performed by the system 10 when the utility power supply source 14 is present along with the generator subsystem 16. FIG. 5 illustrates a table 400 showing operations that may be performed by the system 10 when the utility power supply source 14 and the integrated battery power subsystem 18 are both available, but the generator subsystem 16 is not. The "walk-in" process mentioned in the three scenarios of FIGS. 3-5 for switching over to a power source is a well-known process in the art by which electric power from the source being walked in is gradually applied to the load as power being supplied to the load from an alternate power source is gradually removed. The "soft loading" process also mentioned in FIGS. 3-5 is also a well-known process in the art by which power is gradually drawn from a source to support a load (or a load increase) at the same time as additional power required to support the load is supplied by an alternate power source.

Figure 6:
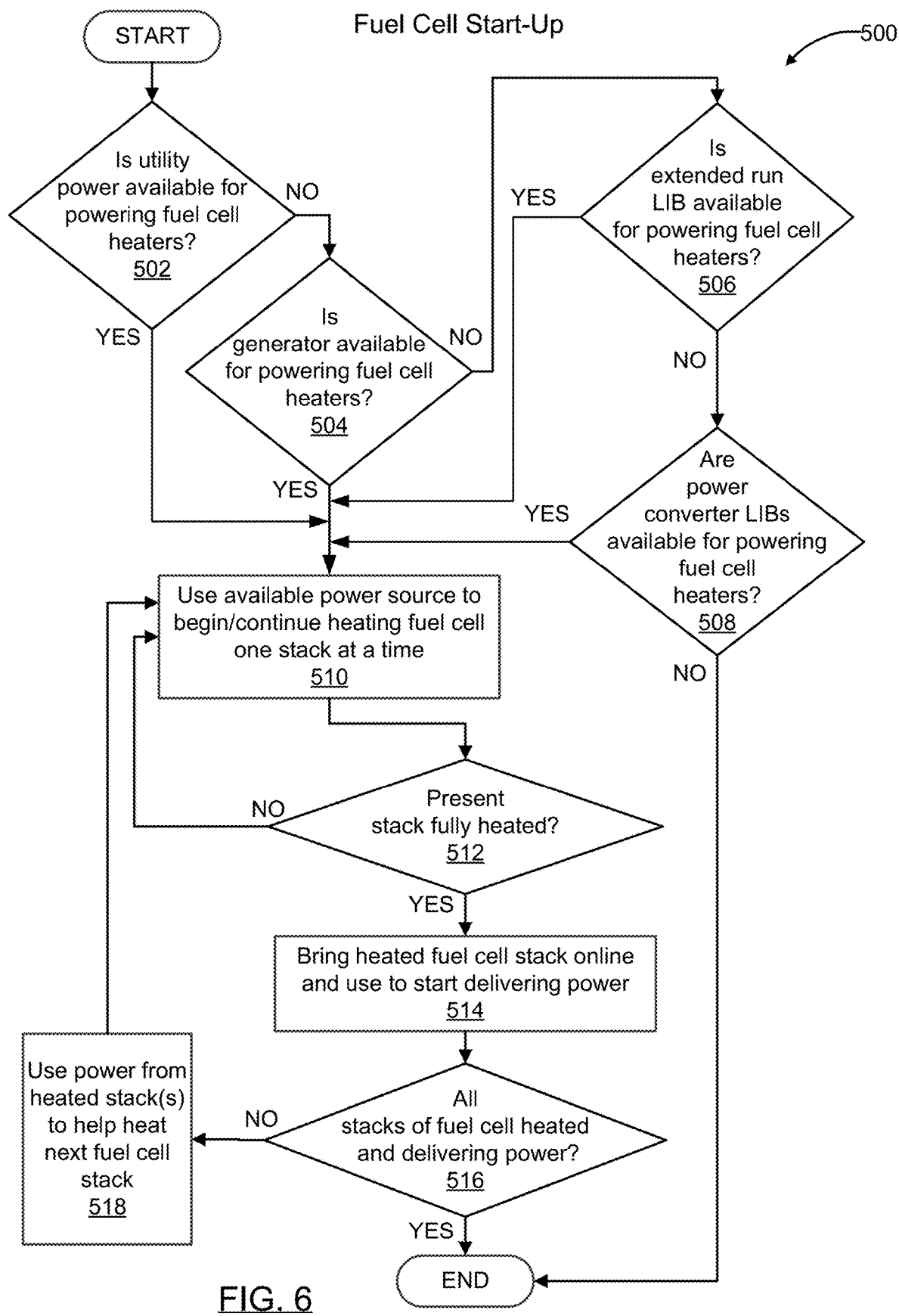
FIG. 6 is a flowchart showing one example of operations that may be performed by the system of FIG. 1 in managing start-up of a fuel cell that is incorporated into the system.

Referring now to FIG. 6, a flowchart 500 is shown to illustrate various operations that may be performed by the system 10 in starting up the fuel cell 12a of fuel cell subsystem 12. Initially at operations 502, 504, 506 and 508 checks are made, in this example in sequential fashion, to determine if utility power is available for powering the fuel cell heaters (operation 502), if a generator is available for powering the fuel cell heaters (operation 504), if an extended run LIB is available for powering the fuel cell heaters (operation 506), or if power converter LIBs are available for powering the fuel cell heaters (operation 508). The "priority" order of these four checks may be modified depending on design preferences, and this particular sequence of checks is therefore just meant to be one example of a suitable "priority" for using the various supplemental power sources that may be available. Also, fuel cells typically incorporate a plurality of stacks with separate heaters, which are brought on line one at a time, and this assumption will be made for this example.

Depending on which ones of the checks at operations 502-508 produces the first "Yes" answer, that particular power source will be used to begin (or to continue) heating of the fuel cell 12a one stack at a time, as indicated at operation 510. If utility power or generator power is present (i.e., operation 502 or operation 504 produces a "Yes" answer), then the power converter 26 or 28 applies DC voltage from its DC bus to the fuel cell heaters. If utility power and generator power are unavailable, then the power converter 26 or 28 applies DC voltage to the fuel cell heaters from the extended run LIB 18a (at operation 506) or from the power converter LIBs 30 (at operation 508) via its DC bus, but at a reduced power level. At operation 512 a check is made to determine if the particular stack presently being heated is fully heated, and if this check produces a "No" answer, then operations 510 and 512 are repeated. If the check at operation 512 returns a "Yes" answer, indicating that the stack being heated is fully heated, then that fuel cell stack is brought online and used to start delivering power, as indicated at operation 514. A check is then made at operation 516 if all of the stacks of the fuel cell 12a have been fully heated. If this check produces a "Yes" answer, then the fuel cell start-up operation successfully concludes. If operation 516 produces a "No" answer, then at operation 518 the stack that has just been fully heated, along with any previously fully heated stack(s), is/are used to begin heating the next stack and supporting the load. Operations 510-518 may be repeated until the check at operation 516 indicates all of the stacks are fully heated and delivering power.

If the check at operation 508 (the last of the four options for powering the fuel cell stack heaters) produces a "No" answer, then the fuel cell start-up procedure is suspended.

Figure 7:
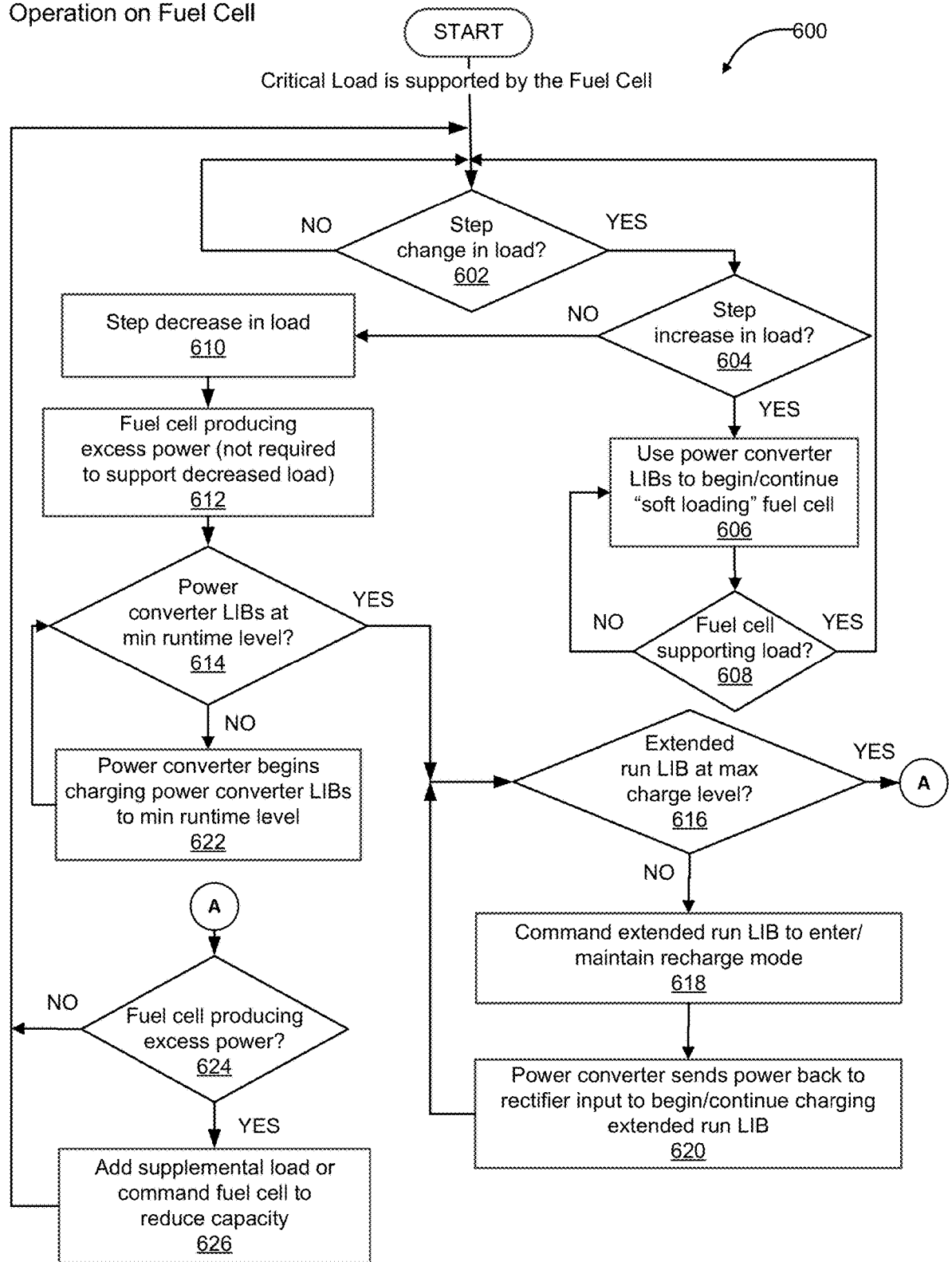
FIG. 7 is a flowchart showing one example of operations that may be performed by the system of FIG. 1 in handling both a step load increase and a step load decrease.

FIG. 7 shows a flowchart 600 illustrating one example of operations that may be performed by the system 10 to monitor for, detect and respond to changes in the load while using the fuel cell subsystem 12 to power the load. For this example it will be assumed that the critical load is being fully supported by the fuel cell subsystem 12 and the preferred mode of fuel cell operation is to remain at constant load. Further, it will be assumed that the extended run LIB 18a has been held at a partial recharge state, which may be a charge level less than its maximum capacity that may be preselected by the system designer. At operation 602 a check is made if a step change in the load has occurred. If this check produces a "No" answer, the system 10 repeats operation 602, continuously monitoring for and detecting load changes; this may be done at the sub-cycle level, for example, at approximately 3 kHz. If the check at operation 602 produces a "Yes" answer, then operation 604 determines if the load change is a step increase.

If the check at operation 604 produces a "Yes" answer, indicating that a step increase in the load has been experienced, then at operation 606 the power converter LIBs 30 may be used to begin/continue soft loading of the fuel cell subsystem 12. "Soft loading" in the present example means that additional energy required to support the load increase is supplied by the power converter LIBs 30 while energy is gradually drawn from the fuel cell subsystem 12. A check is then made at operation 608 to determine if the fuel cell subsystem 12 is fully supporting the load. If it is not, then the soft loading of the fuel cell subsystem 12 continues at operation 606. If this check produces a "Yes" answer, then operation 602 may be repeated as the system 10 continues monitoring for a load change.

If the check at operation 604 produces a "No" answer, indicating that a step decrease in the load has been detected (operation 610), then the fuel cell subsystem 12 is currently producing more power than is required to support the decreased load (operation 612). A series of operations may then be performed to use the excess power from the fuel cell subsystem 12 to recharge the power converter LIBs 30 and the extended run LIB 18a, if necessary. At operation 614 a check is made to determine if the charge level of the power converter LIBs 30 is at its minimum runtime level. By "minimum runtime level" it is meant the level of charge that is required to maintain the battery in operational condition for a time designated by the user. In one example the minimum runtime level may be 80% of maximum battery charge, although this level may be varied higher or lower by the system designer. If the check at operation 614 produces a "Yes" answer, then no recharging of the power converter LIBs 30 is necessary, and a check may be made at operation 616 to determine if the extended run LIB 18a is at its maximum charge level. The maximum charge level of the extended run LIB 18a may reflect system performance factors such as speed of fuel cell response, or may be preset to be 100% of capacity, 80% of capacity, or any other level selected by the system designer. If the check at operation 616 also produces a "Yes" answer, then no recharging of the extended run LIB 18*a* is needed, and at operation 624 the system 10 determines if the fuel cell subsystem 12 is still producing excess power. If so, at operation 626, a supplemental load may be added to keep the system 10 in balance, and if the critical load has not recovered, it may be necessary for the system 10 to command the fuel cell subsystem 12 to reduce its capacity. After operation 626, or if at operation 624 the fuel cell subsystem 12 is no longer producing excess power, the system 10 continues monitoring for a load change at operation 602.

If the check at operation 616 indicates that the extended run LIB 18*a* is not at its maximum charge level, then the system 10 may command the extended run LIB 18*a* to enter (or to maintain) a recharge mode of operation, as indicated at operation 618. Then at operation 620 the power converter 26 sends excess power available from the fuel cell subsystem 12 back to the rectifier input (i.e., the input side of rectifier subsystem 26*b*), to begin/continue charging the extended run LIB 18*a*. Operations 616-620 are repeated until at operation 616 the extended run LIB 18*a* is detected as being charged to its maximum charge level, at which point the check at operation 624 may be performed.

If the check at operation 614 produces a "No" answer, indicating that the power converter LIBs 30 are not charged to their minimum runtime charge level (in this example, 80% of maximum battery charge), then at operation 622 the power converter 26 begins charging the power converter LIBs using excess power from the fuel cell subsystem 12. Operations 614 and 622 are then repeated until the check at operation 614 produces a "Yes" answer, indicating that the power converter LIBs 30 are charged to their maximum predetermined charge level.

It will be appreciated, then, that setting and maintaining the charge levels of the power converter LIBs 30 and extended run LIB 18*a* at values less than 100% of capacity enables excess power from the fuel cell subsystem 12, which suddenly becomes available because of a step decrease in the load, to be "absorbed" or utilized by the power converter LIBs 30 and extended run LIB 18*a* for recharging purposes. Without this feature, the need would exist to immediately introduce a supplemental load, which would serve to immediately help absorb the excess power available from fuel cell subsystem 12, but without serving any other useful purpose. Setting and maintaining the charge level of the power converter LIBs 30 and extended run LIB 18*a* at something less than 100% thus serves two useful purposes: helping to provide a means by which the excess power may be absorbed, as well as using the excess power to recharge the power converter LIBs 30 and extended run LIB 18*a*.

Figure 8:
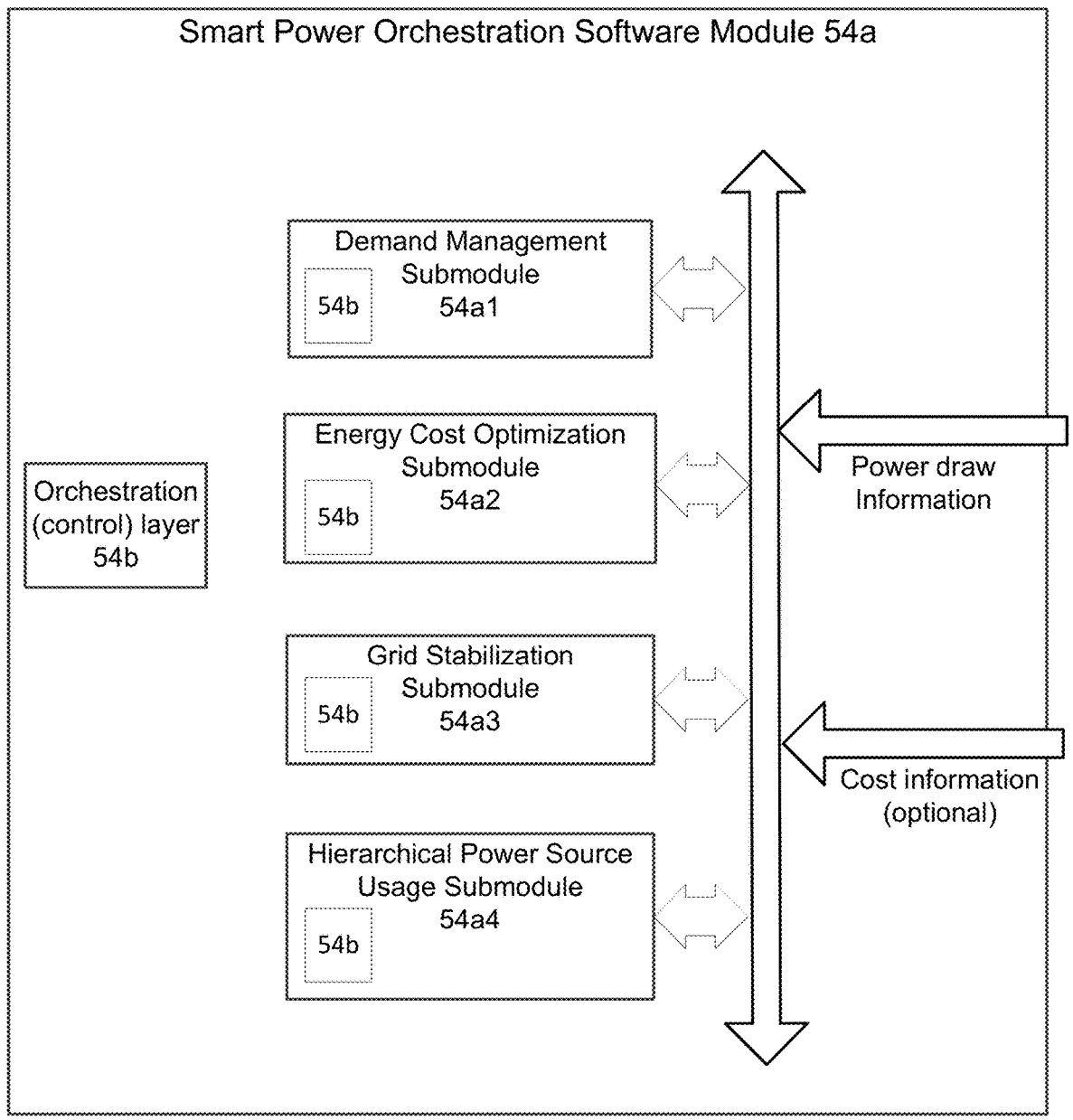
FIG. 8 is a high level block diagram of various submodules that may be included in the smart power optimization software module of the system of FIG. 1.

The smart power orchestration software module 54*a* is shown in greater detail in FIG. 8. The software module 54*a* helps to implement an intelligent control/utilization scheme by which the ultimate goal of the power converters (e.g., power converters 26 and 28) is to always deliver ITIC compliant power to the critical load. To this end, the software module 54*a* may control a number of programs or submodules. For example, a demand management submodule 54*a*1 may involve enforcing a preset limit on utility power draw, such as a limit in response to utility requirements, guidelines, or discount schedules. An "orchestration layer" 54*b*, acting as a control layer, uses external signals or internal predetermined settings to limit the amount of power drawn from the utility. The power converters 26 and 28 source-share between the utility and other available energy sources in the manner described above. For example, if the fuel cell subsystem 12*a* is available, the system 10 may draw energy from it, while in emergency situations the system 10 may draw from the power converter LIBs 30 and/or the extended run LIB 18*a*.

The software module 54*a* may also include an energy cost optimization submodule 54*a*2 to help determine which of two or more available energy sources, at any given time of day, is the lowest cost energy source. The energy cost optimization submodule 54*a*2 may be used to help select the lowest cost energy source, based in part on information provided by the orchestration layer 54*b*, such as from external signals or data, or possibly from saved settings or data which enable it to determine the real time cost of energy each of the available energy sources. It is expected that the lowest cost energy source will be desired to power the critical load in most scenarios, although the software module 54*a* could be configured to account for other unusual scenarios or conditions if, for some reason, the lowest cost energy source should not be used.

If the system 10 is grid tie enabled it may export energy if the cost of generated energy is lower than the recovered grid tie revenue. The system 10 preferably always keeps the power converter LIBs 30 charged to their minimum runtime limits. The system 10 may delay recharging the extended run LIB 30 as long its partial recharge state can be maintained. If the extended run LIB 30 is not at its maximum charge level, it may be recharged until it is (which as noted above may not be the 100% maximum charge value, but instead a lower value, for example, 80%).

The software module 54*a* may also include a grid stabilization submodule 54*a*3. The grid stabilization submodule 54*a*3 works with the orchestration layer 54*b*, and optionally with the energy cost optimization submodule 54*a*2, and further optionally with external signals providing either one or both of power draw and cost information, to determine how much grid stabilization energy is required. The power converters 26 and/or 28 may deliver to its/their respective limit(s) of available power using the energy cost optimization operation to provide the desired grid stabilization energy.

The software module 54*a* may also include a hierarchical power source usage submodule 54*a*4, which, as previously described, may determine the order in which utility proxies are used if the utility power supply becomes unavailable.

Figure 9:
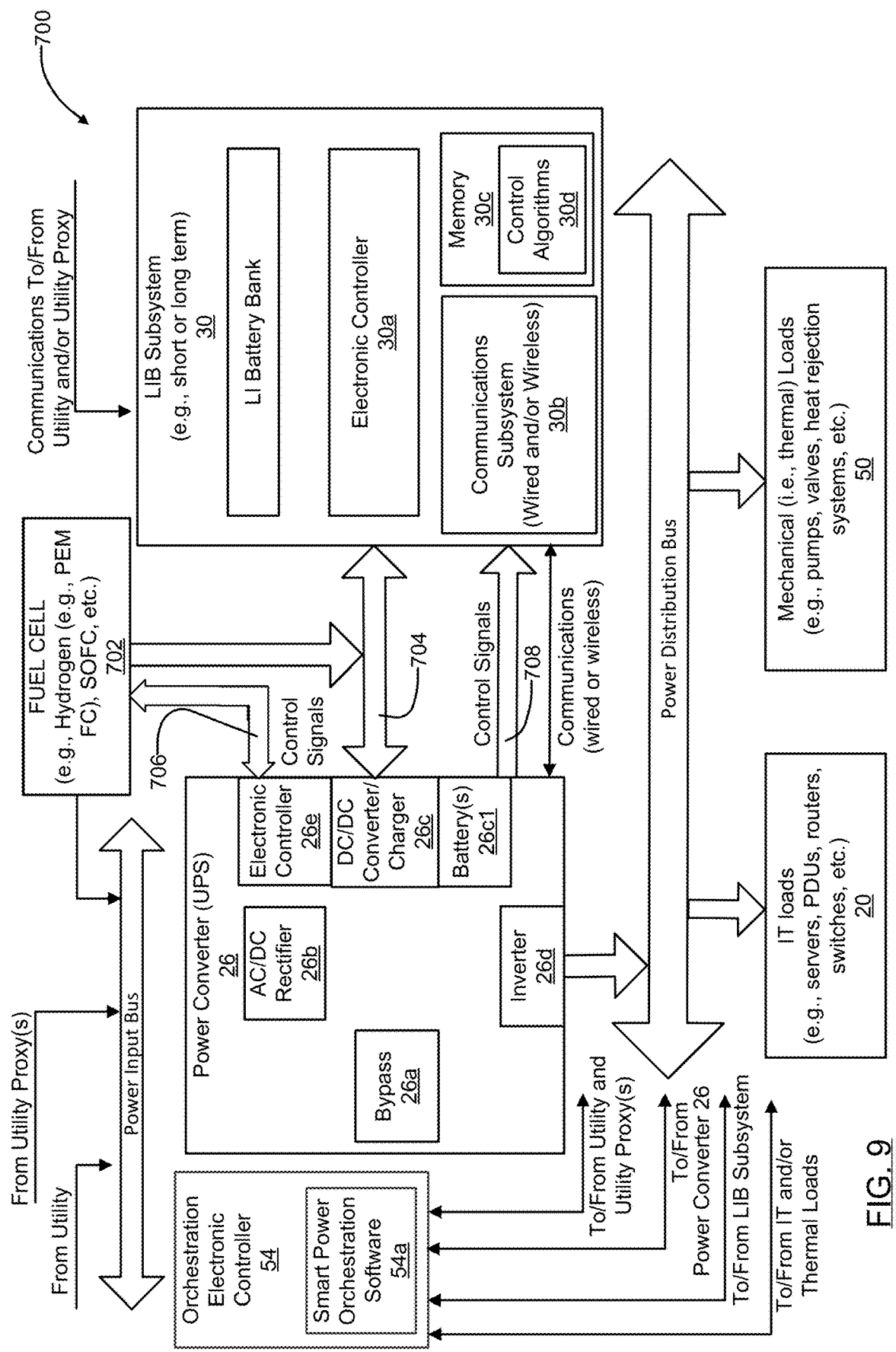
FIG. 9 is a high level block diagram of another embodiment of the present disclosure in which a hydrogen fuel cell is used, and is coupled in a manner to feed either an input power bus or a power bus connecting the LIB subsystem and the DC/DC converter/charger of the power converter, and where the power converter is in communication with the utility and hydrogen fuel cell utility proxy.

Referring to FIG. 9, another embodiment 700 of the present disclosure is shown in which a utility proxy, in this instance a hydrogen fuel cell utility proxy 702 (hereinafter simply "utility proxy" 702), is directly coupled to a DC power bus 704 connecting the LIB subsystem 30 with the power converter 26*a*. While only a single power converter 26 is shown here, in practice two or more power converters could just as readily be coupled to the utility proxy 702 and to the LIB subsystem 30, such as in the manner shown in FIG. 1, so the system 700 should not be interpreted as being limited to use with only a single power converter.

The system 700 also has the LIB subsystem 30 configured with an electronic controller 30*a*, and a communication subsystem 30*b* (e.g., wired or wireless) for assisting in carrying out communications with the various other components of the system and with the utility and the utility proxy 702. The LIB subsystem 30 may also include a non-volatile memory 30*c* for storing control algorithms 30*d* to help with carrying out different operating schemes that the system 700 may be used with.

FIG. 9 also shows the power converter 26 coupled to control busses 706 and 708 for communicating (e.g., control signals) to/from the utility proxy 702 and the LIB subsystem 30, respectively. Both the power converter 26 and the LIB subsystem 30 in this embodiment also are able to communicate bidirectionally with the orchestration electronic controller 54, and the orchestration electronic controller 54 is in bidirectional communication with the utility proxy 702 and the utility. The LIB subsystem 30 optionally may include the capability to communicate bidirectionally directly with the utility and/or the utility proxy 702.

A principal advantage of the system 700 is the coupling of the utility proxy 702 directly to the DC power bus 704 which connects the power converter 26 and the LIB subsystem 30. This enables the utility proxy 702 to provide power directly to the DC/DC converter/charger 26c of the power converter 26. It also enables the utility proxy 702 to be provide power directly to the LIB 30 to re-charge the LIB 30 if excess power is available from the utility proxy Still another benefit of the system 700 is the ability of the power converter 26 to communicate bidirectionally (e.g., control signals) with the utility and the utility proxy 702 via the orchestration controller 54a. This communications capability enables the power converter 26 to poll the utility and/or the utility proxy 702 for information, such as whether information is available from the utility or utility proxy on the anticipated length of a power outage condition when a power outage occurs. This important feature will be discussed further in the following paragraphs.

Figure 10:
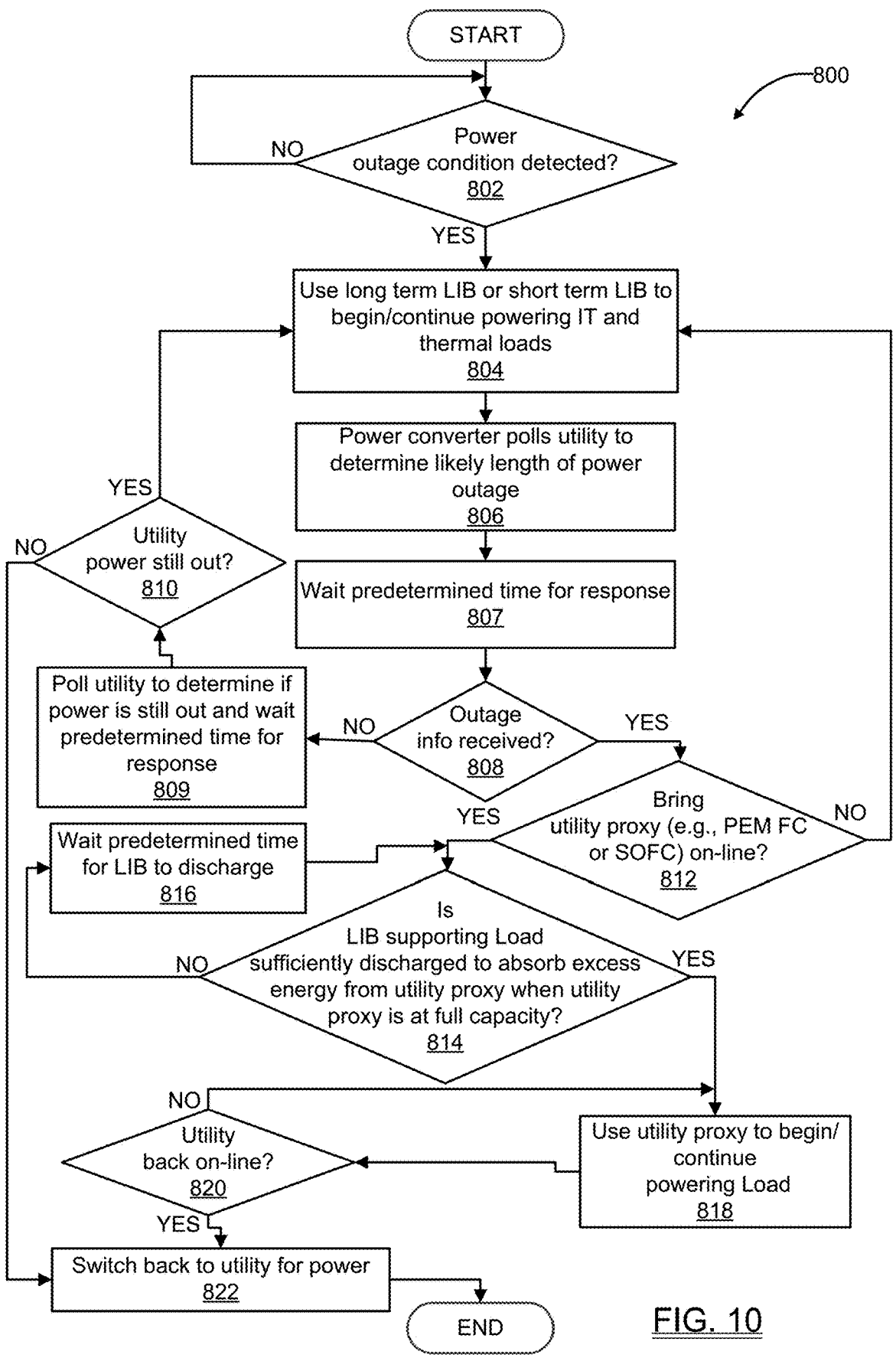
FIG. 10 is a flowchart setting forth major operations of the system of in bringing a utility proxy on-line.

Referring to FIG. 10, a flowchart 800 illustrates at a high level various operations that may be carried out with any one of the systems 10, 100 or 700 when responding to a power outage condition. At operation 802 a check is initially made if a power outage condition has been detected. If this check produces a "No" answer, then after a predetermined time period the check at operation 802 is repeated. If the check produces a "Yes" answer, then at operation 804 either a long term LIB (such as utility proxy LIB 18 in FIG. 1), or the LIB subsystem 30 (acting as a "short term" LIB) may begin powering the IT loads and thermal loads (e.g., loads 20 and 50 respectively in FIG. 1). At operation 806 the power converter (e.g., power converter 26) may poll the utility to determine if information is available on the anticipated length of the power outage. At operation 807 the power converter waits a predetermined time period for a response from the utility. After the expiration of the predetermined time period a check is made at operation 808 to determine if the requested power outage information was received from the utility. If this check produces a "No" answer, then at operation 809 the power converter polls the utility to determine if power is still out and waits a predetermined time for response. At operation 810 a check is made if the information received indicates that power is still out. If this check produces a "Yes" answer, then operations 804-808 are repeated. If the check at operation 810 indicates that utility power is has been restored, then at operation 822 the system 700 switches back to utility power to power the IT and mechanical loads.

If the check at operation 808 indicates that the requested power outage information from the utility was received by the power converter (i.e., a "Yes" answer), then a check is made whether to bring the utility proxy (e.g., fuel cell) on-line, as indicated at operation 812. If this check produces a "No" answer, then operations 804-808 are repeated. If the check at operation 812 produces a "Yes" answer, then a check is made at operation 814 to determine if the LIB supporting the Load is sufficiently discharged to be able to absorb excess energy from the utility proxy (e.g., fuel cell) when the utility proxy is at full capacity. If this check produces a "No" answer, then the system waits a predetermined time period as indicated at operation 816, for the LIB to discharge by at least a small amount, before again performing operation 812. However, if the check at operation 814 produces a "Yes" answer, then the system uses the utility proxy (e.g., fuel cell) to begin (or to continue) powering the Load.

At operation 820, the system again checks if the utility is back on-line. If this check produces a "No" answer, the operation 818 continues. If the check at operation 820 produces a "Yes" answer, then at operation 822 the system switches back to the utility for power, and the control routine ends.

Figure 11:
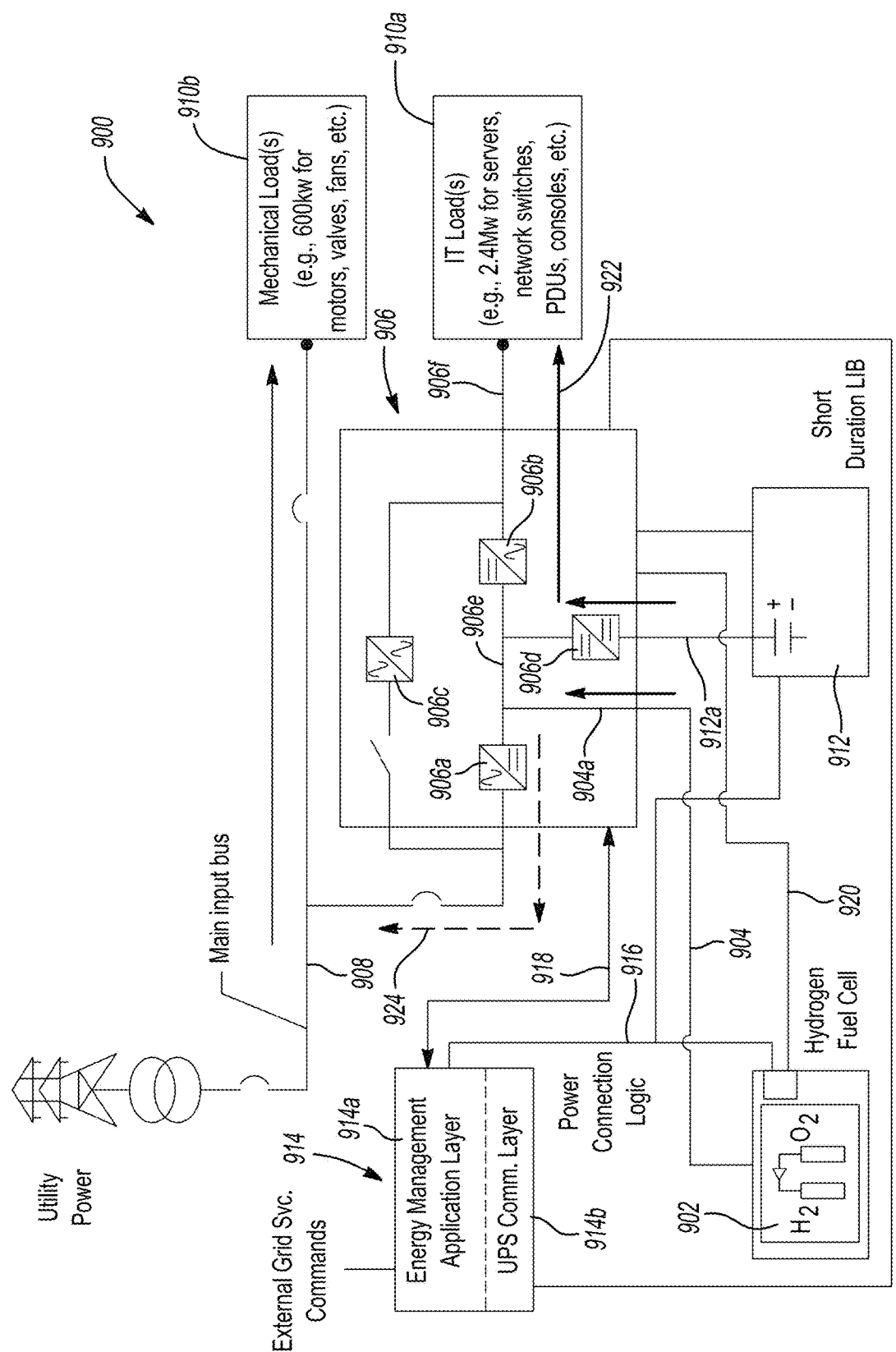
FIG. 11 is another embodiment of the present disclosure illustrating one end state where a fuel cell utility is up and running, while being coupled directly to an internal DC bus of the power converter to supply power to mechanical loads through the rectifier of the power converter, while the LIB supplies power to the IT loads through the DC/DC converter/charger and the inverter.

Referring now to FIG. 11, a system 900 in accordance with another embodiment of the present disclosure is shown. A power converter 906 forms an uninterruptible power supply (UPS) and includes the standard components of an AC/DC rectifier 906a, a DC/AC inverter 906b, a bypass circuit 906c, and a DC/DC converter/charger 906dk. A short term LIB subsystem 912 is coupled directly to the DC/DC converter/charger 906d via a first external DC bus 912a in a manner similar to the system 10. The system 900 in this embodiment differs from the systems 10 and 700 in that a utility proxy 902, in this example a hydrogen fuel cell (referred to hereinafter simply as "hydrogen fuel cell" 902), is coupled via a second external DC bus 904 to a second internal DC bus portion 904a of the power converter 906, which is in turn connected directly to a first internal DC bus 906e of the power converter 906. An output bus 906f is coupled to the IT load(s) 910a in this embodiment. An input bus 908 of the system 900 is coupled to the mechanical load(s) 910b. A short term LIB subsystem 912 is coupled directly to the DC/DC converter/charger 906d via a DC bus 912a in a manner similar to the system 10.

FIG. 11 also shows a management subsystem 914, which may be the orchestration electronic controller 54 shown in FIG. 1, which in this embodiment has two components, an energy management application software layer 914a and a UPS communications layer 914b, which are used to communicate information to other components of the system 900. In particular, the components 914a and 914b may be used to carry out bidirectional communications with the power converter 906, the hydrogen fuel cell 902 and the short term LIB subsystem 912, via communications busses 916 and 918. A separate communications bus 920 may be used to facilitate bidirectional communications between the hydrogen fuel cell 902, the short duration LIB subsystem 912 and the power converter 906. It will be appreciated that the power converter 906 (i.e., also sometimes termed a "UPS") may include its own electronic controller and communications components, similar to that shown in FIG. 9, but omitted in FIG. 11 to avoid unnecessarily cluttering the drawing.

The information and/or commands from the utility may be used by the power converter 906, and/or the hydrogen fuel cell 902, and/or the short duration LIB subsystem 912 to optimize overall operation of the system 900. The energy management layer 914a provides ON/OFF and start-up control, energy cost optimization, demand management participation, and grid services operation.

A principal advantage of the system 900 is that a single power converter can be used to help simultaneously supply power to both the IT load(s) 910a and the mechanical load(s) 910b, using fully separate and independent input power sources. This is accomplished by configuring the power converter 906 in a manner which allows its major subsystems to be used independently of one another to help provide power to both the IT load(s) 910a and the mechanical load(s) 910b. This is achieved by using the short term LIB subsystem 912 to provide DC power to the DC/DC converter/charger 906d and onto the internal DC bus 906e, and then using the DC/AC inverter 906b to provide conditioned AC power to the IT load(s) 910a via bus 906f. The AC power being delivered to the IT load(s) 910a is represented by arrow 922. Simultaneously, the connection of the second external DC bus 904 to the [first] internal DC bus 906e of the power converter 906 via the second internal DC bus 904a enables additional DC power from the hydrogen fuel cell 902 to be supplied directly onto the internal DC bus 906e as well, which is then passed through the AC/DC rectifier 906a in the reverse direction (i.e., reverse to the conventional flow of power coming into the power converter from the utility) to create a fully separate and independent AC power output signal. This AC power output signal is represented by arrow 924. The DC power from the hydrogen fuel cell 902 is thus converted to produce the AC power output signal 924 using the AC/DC rectifier 906a in the reverse direction, and then passed onto the main input bus 908, fully independent of the AC power being supplied to the IT load(s) 910a, where it is fed to the mechanical load(s) 910b.

The system 900, when coupled to the short term LIB subsystem 912 and the hydrogen fuel cell 902 as shown in FIG. 11, effectively enables the power converter to do "double duty"; that is, using its DC/AC inverter 906b to supply a first output to the IT load(s) 910a, while independently and simultaneously using its AC/DC rectifier 906a, to provide separate AC power to supply the mechanical load(s) 910b as well.

The various embodiments of the present disclosure all provide the ability to make use of two or more different utility proxies as power sources, in accordance with a predetermined hierarchy of use. The various embodiments of the present disclosure, in particular, overcome the drawbacks associated with using fuel cells and battery power subsystems as a primary power source. Such power sources are often not sufficiently responsive to real time changes in loads being powered, and the various embodiments of the present disclosure eliminate these drawbacks without significantly complicating the overall system design or significantly increasing its cost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A power supply management system adapted for use with at least one utility proxy power source, to help control powering first and second independent loads when an AC mains power source is not available to provide power to the load, the system comprising:

a power converter forming an uninterruptible power supply (UPS), the UPS including a first DC bus forming an internal DC bus, internal AC/DC rectifier, an internal DC/DC converter/charger, and an internal DC/AC inverter;

the UPS further being configured such that the AC/DC rectifier is in direct communication with both the DC/DC converter/charger and the DC/AC inverter via the internal DC bus;

a short term supplemental battery subsystem in communication with an input of the DC/DC converter/charger of the power converter via a first external DC bus;

the DC/DC converter/charger coupled between the short term supplemental battery subsystem and the internal DC bus;

a utility proxy;

a first bidirectional communications bus directly coupling the utility proxy and the power converter to enable the utility proxy to communicate bidirectionally with both the power converter and the short term supplemental battery subsystem;

a second communications bus directly coupling the utility proxy to an external energy management subsystem remote from the power converter for communications with the external energy management system;

a second external DC bus directly coupling an output of the utility proxy directly to the internal DC bus;

wherein the UPS is configured such that:

the DC/AC inverter receives a first DC current flowing on the internal DC bus from the short term supplemental battery subsystem, and generates a first AC power signal which is transmitted to the first load to power the first load; and the AC/DC rectifier receives a second DC current, via the second external DC bus, from the utility proxy, and generates therefrom a second AC power signal from an AC input side of the AC/DC rectifier, which is transmitted to the second load to independently power the second load.

2. The system of claim 1, wherein the utility proxy is coupled to the second external DC bus of the UPS to supply DC current therefrom to the AC/DC rectifier in a reverse direction.

3. The system of claim 1, wherein the short term supplemental battery subsystem is coupled directly to the first external DC bus to communicate DC current directly to the DC/DC converter/charger.

4. The system of claim 1, wherein the first load forms a load comprised of information technology (IT) components.

5. The system of claim 1, wherein the second load forms a load comprised of mechanical components.

6. The system of claim 1, wherein the first and second AC power signals are generated simultaneously by the UPS.

7. The system of claim 1, wherein the short term supplemental battery subsystem comprises a Lithium Ion Battery (LIB) subsystem.

8. The system of claim 1, wherein the utility proxy comprises a fuel cell.

9. The system of claim 8, wherein the fuel cell comprises at least one of:
a hydrogen fuel cell; or
a solid oxide fuel cell (SOFC).

10. The system of claim 1, wherein the UPS is configured to receive control signals from the utility proxy via the first bidirectional communications bus and to communicate bidirectionally with the utility proxy.

11. The system of claim 1, wherein the UPS is configured to communicate control signals to the short term supplemental battery subsystem.

12. The system of claim 1, wherein the power converter is configured to check whether the short term supplemental battery subsystem is sufficiently charged before bringing on-line the utility proxy when a power outage condition is detected.

13. A method for supplying AC power independently to first and second loads when a utility powering the first and second loads becomes unavailable, the method comprising:

supplying a first DC current via a first external DC bus from a remote short term supplemental battery subsystem to an internal DC/DC converter/charger of a power converter in the form of an uninterruptible power supply (UPS), the DC/DC converter/charger of the UPS being in direct communication with an internal DC bus of the UPS;

the UPS further being configured to include an internal UPS control for controlling the UPS, and having an internal AC/DC rectifier in direct communication with both the DC/DC converter/charger and an internal DC/AC inverter via the internal DC bus;

supplying a second DC current via a second external DC bus coupled directly to an output of a utility proxy, directly to the internal DC bus of the UPS;

using the UPS control of the UPS to communicate directly with the supplemental battery subsystem via a separate communications line;

using a first communications bus to enable direct communication between the utility proxy and the UPS, and also to enable communications between the utility proxy and the supplemental battery subsystem;

using a second communications bus to enable direction communication between the utility proxy and an energy management subsystem independent of the UPS;

using the DC/DC converter/charger to supply DC power, using the first DC current, to the DC/AC inverter of the UPS via the internal DC bus, and using the DC/AC inverter of the UPS to generate therefrom a first AC power signal which is applied to a first load to power the first load; and feeding the second DC current supplied from the utility proxy via the second external DC bus and the internal DC bus onto the internal DC bus, and then in a reverse direction into an AC/DC rectifier using the internal DC bus, and using the AC/DC rectifier to generate a second AC power signal at an AC input thereof; and feeding the second AC power signal out from the AC input of the AC/DC rectifier to a second load to power the second load independently of the first load.

14. The method of claim 13, further comprising using the UPS to query the utility, when a power outage condition interrupting power to at least one of the first or second loads develops, for information on an anticipated length of the power outage condition.

15. The method of claim 14, further comprising causing the UPS to use the information received from the utility on the anticipated length of the power outage condition to determine whether to bring the utility proxy on-line and begin powering at least one of the first or second loads.

16. The method of claim 15, further comprising using the UPS to determine if the supplemental battery subsystem is currently at a state of charge sufficient to enable the supplemental battery subsystem to absorb excess energy from the utility proxy when the utility proxy is operating at full capacity.

* * * * *